A. B. FRENCH.
FISHPOLE REEL.
APPLICATION FILED MAR. 21, 1911.
1,005,015. Patented Oct. 3, 1911.
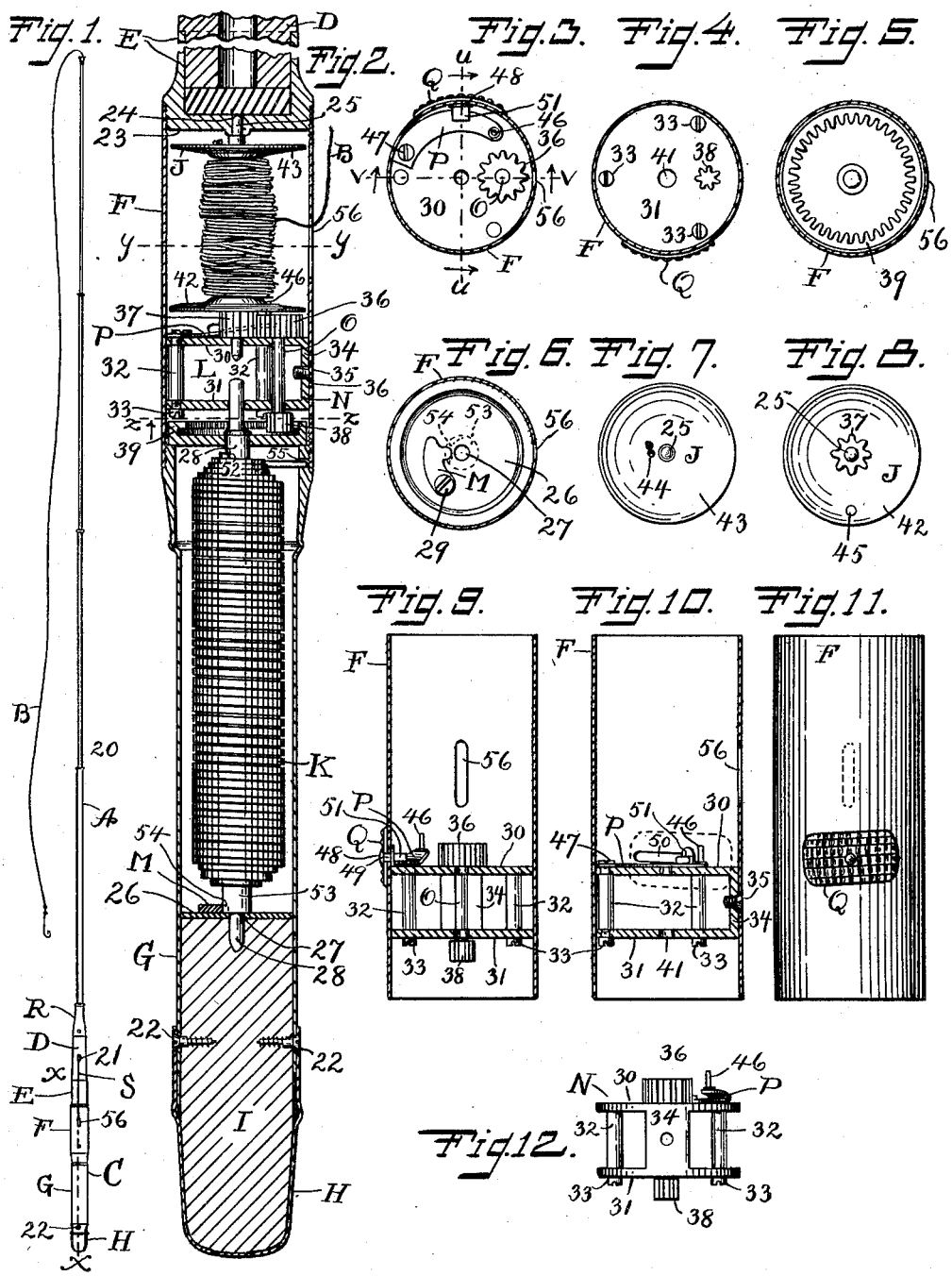
Witnesses.
S. H. Clarke
Burnett Nelson
Inventor.
Arthur B. French.
By Louis M. Schmidt,
Atty.

UNITED STATES PATENT OFFICE.

ARTHUR B. FRENCH, OF NEW BRITAIN, CONNECTICUT.

FISHPOLE-REEL.

1,005,015.            Specification of Letters Patent.      Patented Oct. 3, 1911.

Application filed March 21, 1911.  Serial No. 615,936.

*To all whom it may concern:*

Be it known that I, ARTHUR B. FRENCH, a citizen of the United States, residing at New Britain, in the county of Hartford and State of Connecticut, have invented certain new and useful Improvements in Fishpole-Reels, of which the following is a specification.

My invention relates to improvements in fish pole reels, and the objects of my improvements are convenience and efficiency in use.

In the accompanying drawing—Figure 1 is a side elevation of a fish pole complete and embodying my invention. Fig. 2 is a sectional view on the line $x\ x$ of Fig. 1, on an enlarged scale. Fig. 3 is a sectional view on the line $y\ y$ of Fig. 2, the reel being omitted. Fig. 4 is a sectional view on the line $z\ z$ of Fig. 2, the spring shaft and main driving gear being omitted. Fig. 5 is a sectional view on the line $z\ z$ of Fig. 2 in the opposite direction from Fig. 4, the pinion and shaft of the transmission gearing being omitted. Fig. 6 is a similar view, with the spring and mechanism above the same removed. Fig. 7 is a plan view of the reel. Fig. 8 is a reverse plan of the same. Fig. 9 is a sectional view on the line $u\ u$ of Fig. 3, of certain parts shown in Fig. 2. Fig. 10 is a similar view on the line $v\ v$ of Fig. 3. Fig. 11 is a side elevation of the same, turned 180 degrees from the position shown in Fig. 10. Fig. 12 is a detached view of the lantern member.

A is a fish pole embodying my improvement and comprises a pole proper 20 made up in the usual manner of a series of jointed sections and as shown is of the type in which the line B passes through the interior of the uppermost sections and emerges through a hole 21 near the upper part of the lowermost or butt-section C and from which hole the line extends downwardly to the reel. The said lowermost section C comprises a metal cap or ferrule R at the upper end, fitted over and secured to a wooden plug D which latter has its lower end fitted into the upper end of a conical shell E. A cylindrical reel shell F is secured by its upper end to the lower end of the said conical shell E by a screw thread joint and by its lower end is secured by a similar joint to the enlarged upper end of a generally cylindrical and elongated handle shell G. The lower end of the shell G is telescopically received in a cup-shaped butt-shell H and secured thereto by lateral screws 22, which penetrate a wooden plug I, which latter fills the said butt-shell H and the lower part of the said handle shell G. The lower end of the said conical shell E is closed by a circular bridge 23 which is provided with a central hole 24 and which serves as a bearing for the upper end of the shaft or spindle 25 for the reel J. The lower end of the handle shell G is provided with a similar bridge 26, which is located as shown in abutment with the wooden plug I and which is provided with a central hole 27 which serves as a bearing for the lower end of the shaft or spindle 28 of the driving spring K. A dog M is pivotally mounted on a pin or screw 29 on the upper side of the said bridge 26. A hole 55 in the wall of the handle shell G serves as a means of securing the fixed end of spring K. The interior space L between the two bridges 23 and 26 inclosed at the upper end by the said cylindrical shell F and at the lower end by the said handle shell G constitutes a housing for the reel J, spring K, and operating mechanism therefor to be described. The said hole 21 through which the line B emerges is in the said wooden plug member D and the line extends downward therefrom through a hole or slot 56 in the reel shell F to the reel J to be described. Intermediate the said reel J and spring K is a lantern N comprising an upper disk 30 and a lower disk 31 which are rigidly spaced apart by means of studs 32 and screws 33. An apron 34 secured to the lateral edges of the disks 30 and 31, screw-threaded to receive a screw 35 that passes through a hole 36 in the lateral wall of the cylindrical shell F, serves as a means for locking the said lantern in the said cylindrical shell F. A countershaft O extends through the said disks 30 and 31 and is a part of transmission gearing that operatively connects the said reel J with the spring K which comprises a pinion 36 on the upper end of the shaft O which meshes with a pinion 37 on the lower end of shaft 25 of the reel J and a pinion 38 on the lower end of shaft O which meshes with the main driving pinion 39, the latter being rigidly secured on the shaft 28 of the spring K. The upper disk 30 has a central hole serving as a bearing for the lower end of the reel J and the lower disk 31 has a central hole 41 serving as a bearing for the upper end of the shaft 28 of the spring K. The said reel J comprises the said shaft 25 having its ends pivoted as described, the said pinion 37 secured thereto, and also a pair of spool heads, respectively a lower head 42 and an upper head 43. The latter is provided with a hole 44 for securing the end of the line B.

The lower head 42 has a hole 45 near the outer periphery for receiving a locking pin 46 of locking mechanism. The said locking mechanism comprises the said locking pin 46 which is on the free end of a spring P, shown as a flat spring formed on an arc and extending somewhat more than 90 degrees and approximately concentric with the shaft 25, the fixed end being secured by a screw 47 to the said upper disk 30. The locking spring P tends normally to force the locking pin 46 upwardly so that the same will enter the locking hole 45 when the reel J is turned to the position for the said pin and hole to register with one another. A thumb piece Q is provided with means for disengaging the said locking pin and hole comprising a stud 48 having a neck 49 extending through and a fit for an angularly disposed cross-slot 50, in the cylindrical shell F and having a head 51 which overhangs the said locking spring P, the inclination of the said slot 50 being such that as the thumb-piece Q is moved toward the locking pin 46 the head 51 depresses the spring and pulls the locking pin out of and away from the hole 45 and is frictionally held in such disengaged position. The said thumb-piece comprises a plate-like structure, concentric with and shaped to conform to the adjacent wall of the pole structure along which it moves; covers the said cross-slot or way 50, and has a movement concentric with the axis of the pole. The spring K is mounted on the said shaft 28, which has its ends engaged with the disk 31 and bridge 26 as described, and the driving pinion 39 secured to the upper end. Near the upper end the shaft 28 has a hole 52 suitable for receiving and holding the inner end of the spring K. The outer or fixed end of the spring K is secured in the hole 55 as mentioned. The lower end of the shaft 28 is provided with an enlargement 53 which has a notch 54 suitable for engaging with the dog M. The said dog M and notch 54 are similar to the type of dog and notch that is commonly used in shade rollers. When the dog M is engaged with the notch 54 the same is held engaged therewith by the pressure of the spring K.

The hole 55 for receiving the end of the spring K extends through the wall of the handle shell G, and the same is located in the same longitudinal plane generally as the dog M and on the other side of the axis, so that the said hole 55 operates as an indicator to show the location of the dog. This is a convenience in engaging and disengaging the dog and its notch in adjusting the tension of the spring K, which operation corresponds essentially to the adjustment of the tension of a shade roller spring.

I prefer to make the driving gear or pinion 39 an internal gear as shown, whereby a high speed is obtainable, notwithstanding the confined limits of the space or chamber L available for the transmission gearing.

As described, my reel is automatic in operation, and the line is entirely inclosed except for a small portion between holes, which is for convenience of access and in operating, and it is obvious that complete inclosure of the line as well as the reel is a possibility if desirable.

One of the advantages of my invention is the ability to travel through closely grown brush and thickets that are difficult to travel and in which it may be necessary to drag the pole by means of the line. In such a condition there are no exposed parts of the reel or its mechanism that are liable to catch on obstructions and interfere with the progress of the traveler.

When the cylindrical shell F is screwed onto the handle shell G, the holes 55 and 56 are in longitudinal alinement on the same side of the axis, so that under normal conditions and when the hole 55 is covered, the hole or slot 56 serves as an index as to the position of the dog M. Accordingly, the operator can, under normal conditions, manipulate the rod so that the dog M will engage with the notch 54 or will disengage therefrom, depending upon either gravity or a throw of the pole butt to move the dog in the direction desired. When under such conditions the dog is disengaged from its notch, the manipulation of the line B is under direct control of the operator by means of the exposed portion S, between holes 21 and 56, and the locking mechanism. When the dog is disengaged from its notch and also the locking mechanism is disengaged and the line free, the winding of the line on the reel is limited in an ordinary manner by an enlargement on the line B such as the hook or other attachment abutting with the outer end of the pole.

It will be noted that when the conical shell E is removed the reel J is exposed and readily removable from the cylindrical shell F, and when the latter is removed the driving gear 39 is exposed and accessible, and also that the same and the driving spring K are removable from the handle shell G after the fixed end of the spring has been disengaged from the hole 55.

The construction and arrangement of the reel and operating mechanism described are such that the parts enumerated that inclose the operating chamber may be readily disassembled and put together again with the parts of the mechanism in proper position for coöperation. Accordingly, the lowermost or butt section C of the fish pole A is a composite structure comprising on the exterior the ferrule R, plug D, conical shell E, reel shell F, handle shell G and the buttshell H. Within the said butt section C there is the reel J, spring K, transmission gearing interconnecting the same and supported by the lantern N, holding mechanism, comprising in part the dog M, and locking mechanism comprising in part the spring P and the finger piece Q. Unscrewing the conical shell E exposes the reel J so that the same is free to be removed, and without disturbing any other part. Unscrewing the reel shell F and the handle shell G exposes the main driving gear 39 and the main driving shaft which carries the spring K, and which gear, shaft, and spring constitute the main driving unit, and same is free to be removed when exposed as described. Removing the holding screw 35 releases the lantern N, so that the entire transmission gearing may be removed as a unit from the reel shell F, and in either direction as desired.

Initial tension may be applied to the spring K if desired by manipulation of the main driving gear 39, and which tension will be held by the dog M engaging with the notch 54. The direction of motion of the reel and connected mechanism by pulling the line outward is such as to increase the tension of the spring K. As under normal conditions of use a length of line corresponding approximately to the length of the pole will be unreeled, the unreeling of this amount of line will provide tension that is generally sufficient, without the necessity of providing initial tension in the manner described above.

The locking mechanism described and controlled by the finger piece Q operates to positively hold the reel in a given position. The notch 54 is elongated and permits the engaging nose of the dog M to slide out and disengage therefrom when the line is unreeled or pulled out and holds the mechanism against rotation in the contrary direction when the said nose is engaged therewith, all as is ordinary and found in shade roller devices. The engagement of the dog M and notch 54 is effected either by gravity, as when the rod is held in position so that the dog will fall by gravity in the direction of the notch 54, or by a throw of the pole in proper direction, the slot 56 serving as an index as to the position of the dog for this purpose. Holding the pole horizontally, the slot 56 uppermost, a pull on the line relieves the dog M and the line is placed under tension of the spring K and is controlled by the locking device. Under this condition the operator may operate with a fixed length of line by pulling out the length desired and locking and by unlocking, he may allow the same to reel automatically. By turning the pole 90 degrees from the position indicated the dog will be in position to engage with the notch and will do so when the notch is in registration therewith.

I claim as my invention:

1. A fish pole having a butt provided with an internal chamber and actuating mechanism, transmission gearing, and a reel operatively housed therein; the inclosing lateral wall of the said chamber comprising a single wall structure and means for closing the ends thereof, the said lateral wall composed of elements that are separably united and comprising a reel shell, and a handle shell, and a separable conical shell element constituting the means for closing one end of the said chamber, and the location of the said mechanism gearing, and reel in said chamber such that the separation of the said elements permits of access to the said mechanism and reel individually and each independent of the other.

2. A fish pole comprising a chamber having a side wall, a reel, transmission gearing, and actuating mechanism operatively housed therein, the said transmission gearing self-contained as a unit, of skeleton construction, and provided with means for being fixedly located in the said chamber, the said means comprising a laterally disposed and longitudinally extending apron, and a screw connecting the said apron and side wall and the said transmission gearing serving as a division wall, dividing the said chamber into spaces suitable for housing the reel at one end and the actuating mechanism at the other end.

3. A fish pole having a reel, actuating mechanism, and connecting mechanism, the said actuating mechanism comprising a shaft, a notch on said shaft coöperative with a dog mounted on a fixed axis, and suitable for restraining the said actuating mechanism in one direction of operation, and the said dog operative to be disengaged from the said notch by gravity when the said pole is held in a predetermined position.

4. In a fish pole having a reel and actuating mechanism therefor, a chamber in said pole in which the said reel and mechanism are operatively housed, the said reel having a head and provided with a locking hole in the head, a spring located concentrically with the axis of the pole, having one end fixed and the other provided with a locking pin fitting said hole, and the said spring tending normally to project the said pin into position for registration with and engagement with the said hole, an inclined way provided in the side wall of the said chamber, a friction pin engaged with the said way, provided at the inner end with an overhanging nose engaged with the said spring, and at the outer end with a thumb-piece in contact with the said side wall, and operative as a handle, and the said friction pin operative in one position in the said way to permit the free movement of the said spring, and in another position to hold the said locking pin away from position of engagement with the said locking hole, and the said thumb-piece comprising a plate-like structure, shaped to conform to the said outside wall, and having a movement concentric with the axis of the pole.

5. In a fish pole having a reel, and actuating mechanism therefor, the said reel having a head provided with a hole suitable for receiving and engaging with a pin, a flat spring fixed at one end and carrying the said pin at the free end, and normally tending to project said pin into position for engagement with the said hole, a friction pin having a limited motion in an inclined way, provided at the inner end with a nose overhanging the said spring and at the outer end with a thumb piece operative as a handle, and the said pin operative in the said way so that at one extreme it will permit the free movement of the said spring, and at the other extreme it will hold the said pin away from position of engagement with the said hole.

ARTHUR B. FRENCH.

Witnesses:
NEWTON L. LOCKWOOD,
SHEFFIELD H. CLARKE.

Copies of this patent may be obtained for five cents each, by addressing the "Commissioner of Patents, Washington, D. C."